United States Patent [19]

Young

[11] 4,425,979
[45] Jan. 17, 1984

[54] MOTOR VEHICLE

[75] Inventor: William C. Young, Evansville, Ind.

[73] Assignee: Young Motor Corporation, Evansville, Ind.

[21] Appl. No.: 332,086

[22] Filed: Dec. 18, 1981

[51] Int. Cl.³ .................... B60K 5/04; B60K 17/04
[52] U.S. Cl. .................................. 180/264; 180/12; 180/71; 180/265; 180/295; 474/5
[58] Field of Search .............. 180/264, 265, 21, 12, 180/71, 70 R, 292, 295, 297, 299; 474/4, 5, 6

[56] References Cited

U.S. PATENT DOCUMENTS

| | | | |
|---|---|---|---|
| 2,202,810 | 6/1940 | Blanc | 180/21 |
| 3,045,773 | 7/1962 | Sampietro | 180/43 |
| 3,108,481 | 10/1963 | Westmont | 474/5 |
| 3,771,618 | 11/1973 | Ekas | 180/264 |
| 3,776,354 | 12/1973 | Duclo et al. | 180/297 |

Primary Examiner—Joseph F. Peters, Jr.
Assistant Examiner—Donn McGiehan
Attorney, Agent, or Firm—Barnes & Thornburg

[57] ABSTRACT

A motor vehicle is disclosed having a main frame with rear wheels in substantially fixed alignment supporting the main frame, a steerable frame provided at the forward end of the main frame including front wheels in fixed alignment with the steerable frame and a motor mounted on the steerable frame. The front wheels are separated from each other a distance smaller than the separation of the rear wheels. A pivot connects the steerable frame to the main frame, the lower end of the axis of the pivot being in front of the upper end of the axis such that any angular displacement of the steerable frame with respect to the main frame causes a lateral displacement of the ground-engaging portion of the front wheels. Exhaust gases are directed from the motor to the rear of the main frame through a pivotal connection between a manifold and tail pipe, the pivotal connection being in axial alignment with the steering axis of the steerable frame. Forward motion of the vehicle is provided by a belt-driven torque converter while reverse direction is provided by a pulley mounted on a pivotally supported arm which, when engaged, provides torque to the driven wheels greater than the torque provided by the forward-driving torque converter, hence causing the motor vehicle to move in a rearward direction.

11 Claims, 9 Drawing Figures

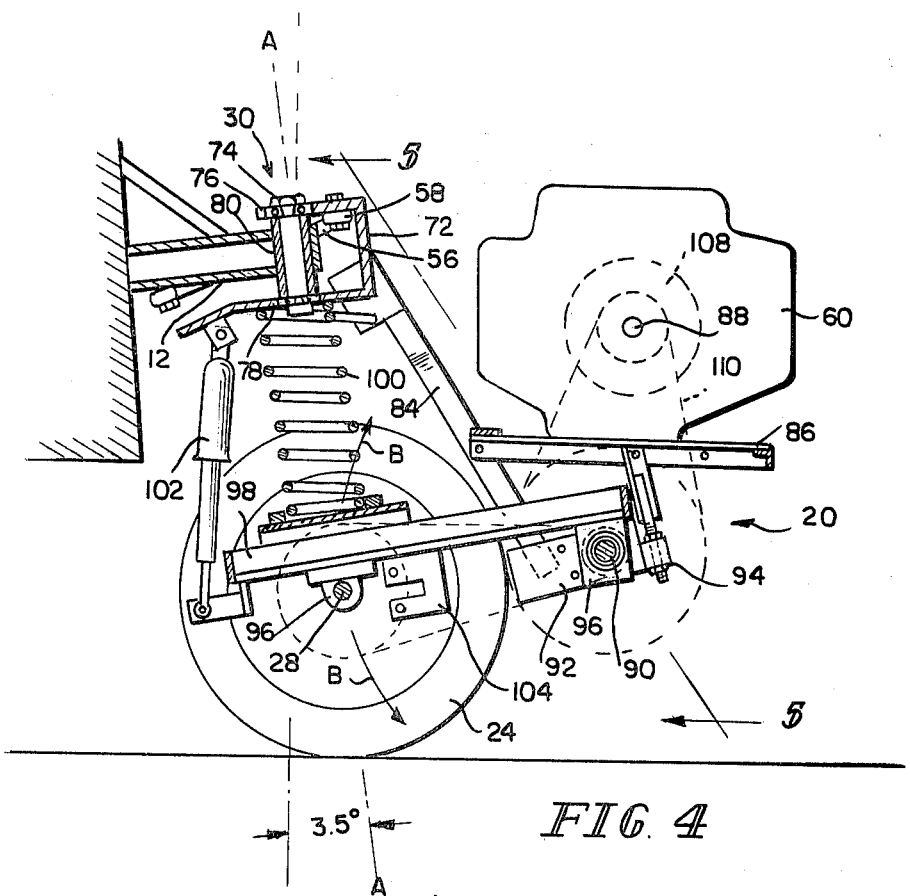
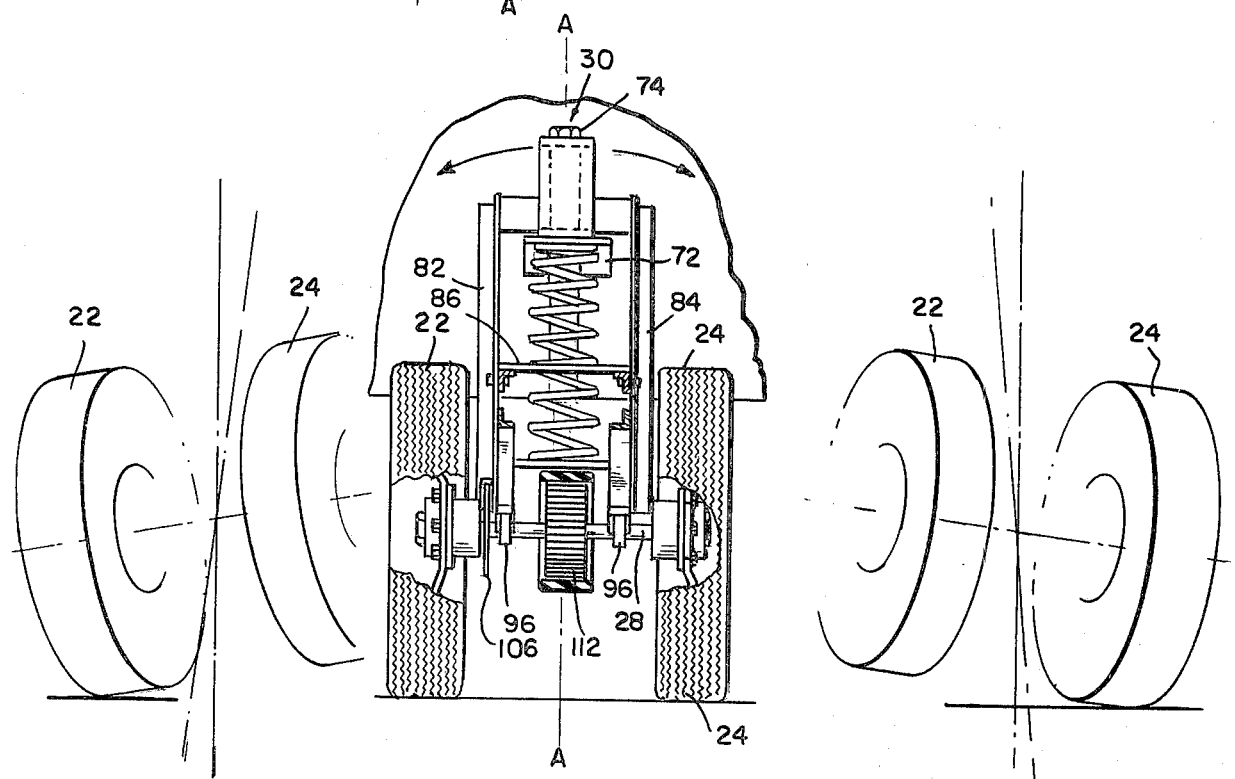

MOTOR VEHICLE

The present invention relates to motor vehicles and particularly to motor vehicle drive systems having a pair of wheels, which are both driven and steerable, joined by a driven axle which is swingable about an axis of pivot to provide the steering, the motor being mounted to swing therewith, the driven axle being also swingable about a horizontal axis.

In the search for a motor vehicle which is of simple construction, durable, yet with fuel economy and safety as its primary concern, various designs have been considered. In recent years, motor vehicles having front-wheel-drive mechanisms have become predominant in the field of emerging technology. Typically, the front-wheel-suspension and drive systems for such automobiles have included a transversely mounted engine which, by way of a transmission or torque converter, powers a drive shaft arranged parallel to the engine, the ends of which are coupled to the front wheels of the vehicle by various means. The front wheels of the vehicle are steerable and are typically turned with the aid of a universal joint being inserted between the drive shaft and the steerable wheel. An example of such a front-wheel drive suspension system is to be found in U.S. Pat. No. 3,045,773. While such systems are clearly advances over more conventionally designed, rear-wheel-powered, motor vehicles, such systems are very complex and typically require very close tolerance to provide the required power and satisfactory alignment of the system.

Various suggestions have been made to simplify such mechanism by including a power-driving unit which is swingable as a unit together with the steerable wheels of the vehicle. An example is to be found in Blanc U.S. Pat. No. 2,202,810. Blanc recognized that improved performance of a motor vehicle could be achieved by designing a chassis which includes a swingable, power-driving unit which would cause the driven wheels to assist in banking the vehicle and would distribute the weight of the motor to the inside of a turn and thereby improve the turning characteristics of the vehicle. Blanc, however, used an engine with the usual flywheel, transmission, and differential to link his engine to the driven wheels. Thus, while superior performance characteristics might be expected from a vehicle constructed in that manner, the driving mechanism was as complex and costly as the usual drive mechanism employed in more conventional motor vehicles.

It is an object of the present invention to design a motor vehicle which will have the performance characteristics in curves similar, yet superior, to the Blanc design yet with a much simpler drive mechanism.

In accordance with the present invention, the motor vehicle is provided with a main frame with rear wheels connected to the main frame in substantially fixed alignment to support the main frame. A steerable frame is provided at the forward end of the main frame which includes front wheels in fixed alignment with the steerable frame, the front wheels being separated from each other by a small distance so as to have a laterally extending, ground-engaging portion. A pivot connects the steerable frame to the main frame behind the front wheels, the lower end of the axis of the pivot being in front of the upper end of the axis. In this manner, angular displacement of the steerable frame with respect to the main frame causes a lateral displacement of the ground-engaging portion of the front wheels. Any significant angular displacement of the steerable frame with respect to the main frame may cause one of the front wheels to leave the ground.

Generally, the pair of front wheels are solidly connected to an axle joining the pair; and the axis is connected to the steerable frame normal to, and in substantial alignment with, the axis of the pivot connecting the steerable frame to the main frame. The front wheels are separated from each other by a distance which is only a fraction of the distance separating the rear wheels which support the main frame. Generally, a biasing means is provided between the steerable frame and the axle of the steerable frame for biasing the front wheels in contact with the vehicle-supporting surface. Preferably, the biasing means is a coil spring aligned with the axis of the pivot connecting the steerable frame to the main frame.

The main frame of the motor vehicle extends forward of the steerable frame and surrounds the same to provide a generally, conventionally appearing body. A passenger compartment is situated on the main frame with a substantially closed body surrounding the passenger compartment. A windshield is provided in the body in the conventional position for permitting the occupant of the passenger compartment to view the forward direction of the motor vehicle. A door is provided which permits the ingress and egress of passengers, the door being hinged to the body adjacent the top of the windshield, the door extending rearwardly therefrom over substantially the full extent of the main frame.

In the present invention with the motor mounted on the steerable frame, a unique exhaust system is employed to direct the exhaust of the rear of the vehicle. The exhaust system includes a manifold connected to the motor and a tail pipe supported by the main frame. A pivotal connection is provided between the manifold and the tail pipe, the pivotal connection being in axial alignment with the turning axis pivot connecting the steerable frame to the main frame. This pivotal connection allows the engine and manifold to rotate from left to right while permitting the exhaust gases to pass freely out the rear of the motor vehicle.

The steerable frame of the present invention includes a motor support and a front-wheel support which extends rearwardly from the motor support. The front-wheel support is pivotally mounted with respect to the motor support about a horizontal axis with the front wheels being connected to the front-wheel support rearward of, and remote from, the horizontal axis. The motor is mounted on the motor support in transverse relationship with a rotatable drive shaft supported on the motor support underneath the motor substantially colinear to the horizontal axis about which the front-wheel support pivots. A toothed belt or other appropriate means can be provided for transmitting power from the rotatable drive shaft to the front wheel axle whereby the motor vehicle can be caused to move. A belt-driven torque converter coupled to the motor drives the drive shaft for moving the motor vehicle in a forward direction.

To provide for reverse direction power, an arm is movably connected to the motor support with a torque-transmitting element supported on the arm. Means are provided for engaging this torque-transmitting element with the rotatable drive shaft and further means are provided for supplying torque from the motor to the torque-transmitting element in excess of that supplied by the torque converter. In one practical embodiment, the torque-transmitting element comprises a pulley mounted on a first arm pivotally connected to the motor support for selective engagement with the rotatable drive shaft. A belt is provided which is frictionally engageable with the first pulley and with the motor, the belt being in a normally non-engaged condition. A second arm rotatably connected to the motor support has a cam surface afixed thereto which contacts the first arm and, upon rotation of the second arm, causes the first arm to move relative to the drive shaft such that teeth on the first pulley engage a similarly toothed gear fixed to the drive shaft. A second pulley is provided on the second arm which engages the belt and tightens the same, thereby increasing its frictional contact with the motor and first pulley. The gear ratios are selected such that the torque provided from the motor to the drive shaft with this reverse gear engaged is greater than the torque provided by the forward-driving torque converter, hence causing the motor vehicle to move in a rearward direction.

A motor vehicle constructed according to the present invention enjoys many advantageous features such as the absence of complex mechanisms such as conventional differentials and transmissions. Further, since the steerable wheels are fixed to a single short axle, all of the conventional, front-end mechanisms required to assure alignment of the front wheels are unnecessary. This simplification of vehicle design is readily transmitted into economy of construction, yet without any sacrifice in quality.

The steering of the present vehicle can be accomplished through a standard steering wheel and standard steering gearbox. A control arm is mounted on the gearbox with a tie rod attached to the control arm. The tie rod is then connected to the steerable frame forward of the axis of the pivot connecting the steerable frame to the main frame. As a result, when the steering wheel is turned clockwise, the entire engine and front-drive frame assembly moves to the right; and when the steering wheel is turned counterclockwise, this assembly moves to the left, thereby giving the driver complete control of both forward and reverse movement. This arrangement provides for a very unique handling quality. When the steering wheel is turned, the weight of the engine and front steerable frame thrust toward the direction turned. The steerable frame also tilts in the direction of the turn. These two movements combine to allow a motor vehicle of this design to have dynamic and responsive handling characteristics even on unstable surfaces such as gravel or rain-slick pavement.

Other features and advantages of the present invention will become apparent to those skilled in the art upon consideration of the accompanying drawings which illustrate the invention and show a preferred embodiment exemplifying the best mode of carrying out the invention as presently perceived.

In such drawings:

FIG. 4 is a sectional detailed view of the front-wheel suspension system of the present invention;

Figure 6:
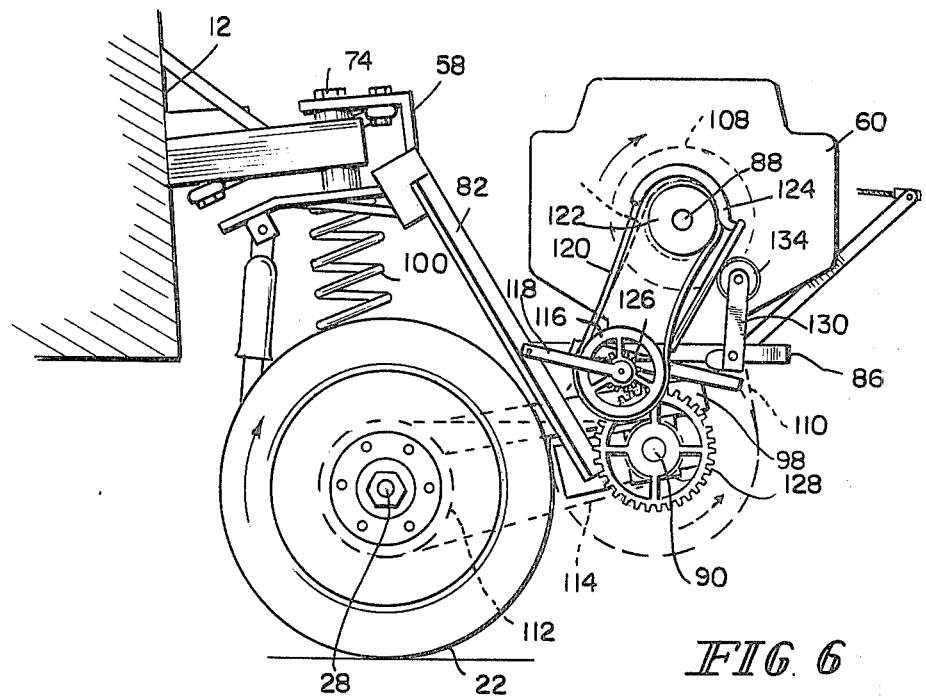
Figure 7:
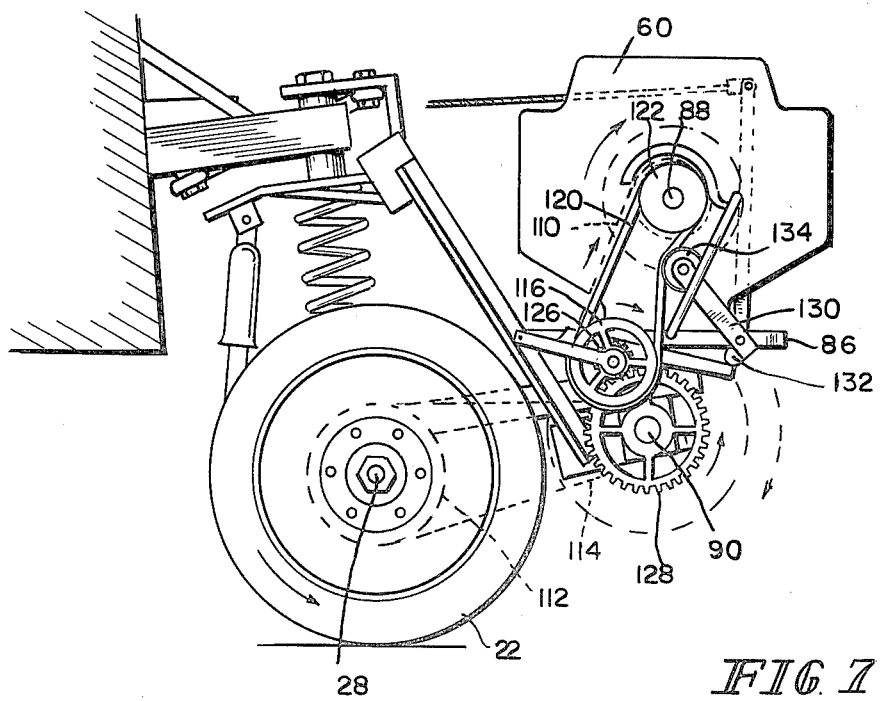

FIGS. 5A, 5B, and 5C are schematic diagrams of the front-wheel suspension viewed from line 5—5 in FIG. 4 showing the performance of the assembly during right and left turns;

FIG. 6 is another view of the vehicle drive system when the motor vehicle is moving forward;

FIG. 7 is a view similar to FIG. 6 illustrating the drive system when the vehicle is moving backward.

A motor vehicle of the present invention 10 includes a main frame 12 upon which a body 14 is supported. A pair of rear wheels 16 and 18 are connected to the main frame 12 by appropriate stub shafts, bearings, and the like (not shown), the rear wheels being fixed in substantial alignment with the main frame for supporting the same with respect to the road or other vehicle-supporting surface upon which the motor vehicle rests.

The vehicle 10 also includes a steerable frame 20 at the forward end of the main frame 12. Front wheels 22 and 24 are connected to the steerable frame 20 in fixed alignment therewith and support the steerable frame 20 on the underlying vehicle-supporting surface. The front wheels 22 and 24 include a ground-engaging portion 26 which extends laterally to the extent of the separation of the two front wheels 22 and 24. The front wheels 22 and 24 are joined by an axle 28. The front wheels 22 and 24 are separated from each other by a distance which is small as compared to the distance separating rear wheels 16 and 18. A pivot 30 connects the steerable frame 20 to the main frame 12. The pivot 30 is located behind the front wheels 22 and 24 and is inclined such that the lower end of the axis A—A of the pivot 30 is in front of the upper end of the axis. The axle 28 connecting the front wheels 22 and 24 is connected to the steerable frame 20 so as to be substantially normal to, and in substantial alignment with, the axis A—A of the pivot 30.

Figure 1:
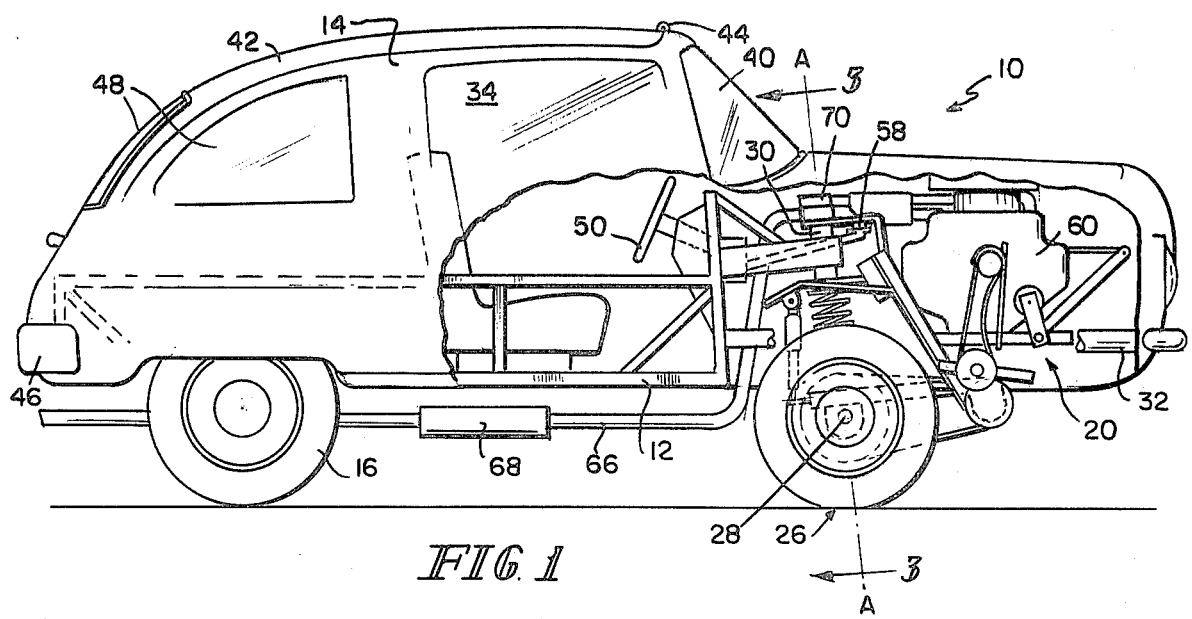
FIG. 1 is an elevational view of the right side of the motor vehicle partially cut away to reveal various internal components.
Figure 2:
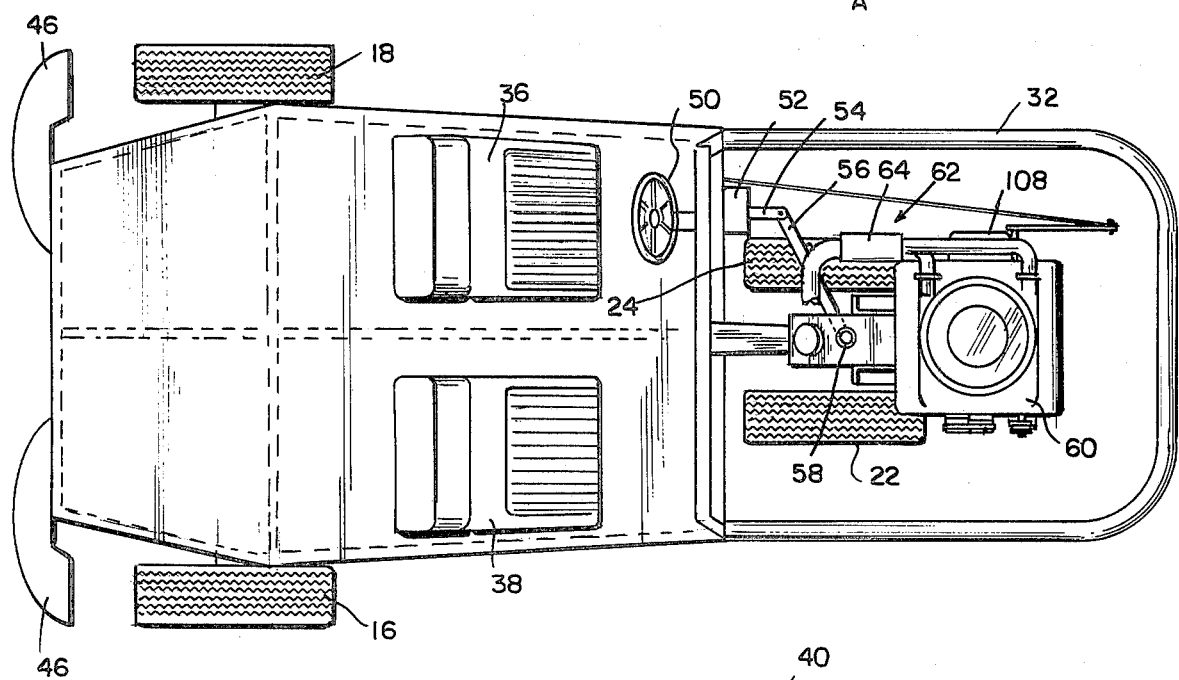
FIG. 2 is a plan view of the vehicle with the body removed.
Figure 3:
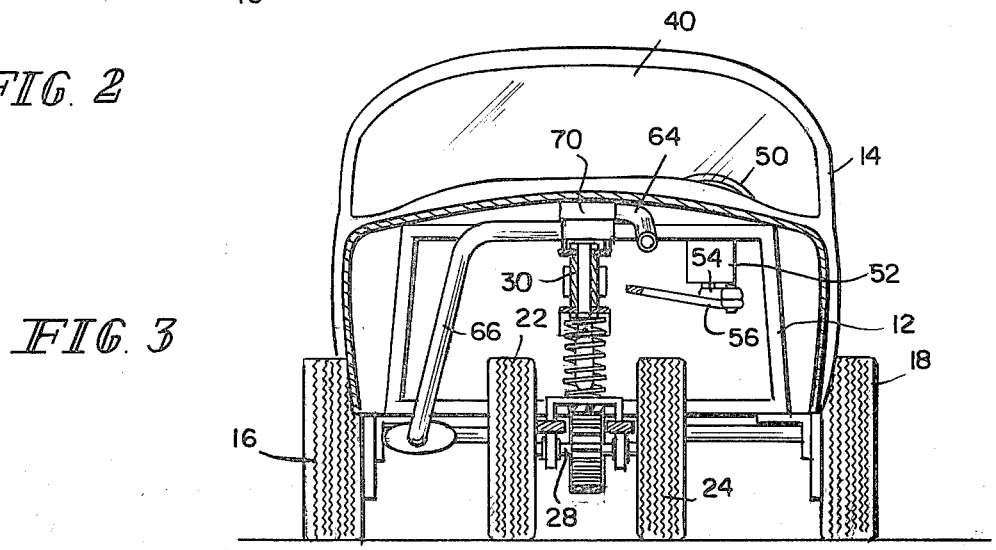
FIG. 3 is a sectional view of the motor vehicle shown in FIG. 1 taken along line 3—3.

The main frame 12 includes a forward extension 32 which surrounds the forward portion of the steerable frame. The body 14 includes a passenger compartment 34 wherein is located a seat 36 for the driver of the vehicle and one or more seats 38 for other occupants of the vehicle. The body 14 is substantially closed and surrounds the passenger compartment and the engine compartment defined by the forward extenion 32 of frame 12 so as to form an appropriately aerodynamically responsive body. A windshield 40 is provided in the usual location through which an occupant of the passenger compartment 34 can view the forward progress of the motor vehicle 10. A door 42 is provided permitting ingress and egress of passengers from the passenger compartment 34. The door 42 is hinged to the remaining portion of body 14 by one or more hinges 44 adjacent the top of windshield 40. The door extends rearwardly from hinges 44 over substantially the full extent of main frame 12 to a rear bumper 46 which is preferably in split form as shown in FIG. 2. Other windows 48 are provided to optimally permit the occupants of the car to have maximum visual contact with their surroundings. The passenger compartment 34 includes a steering wheel 50 as well as other conventional controls for the operation of a motor vehicle. The steering wheel 50 is connected in the conventional manner to a standard steering gearbox 52. A control arm 54 is controlled by gearbox 52 and is connected to tie rod 56. The tie rod 56 is connected to the steerable frame 20 by bearing 58 in front of pivot 30.

A motor 60 is fixed to steerable frame 20 for movement therewith. An exhaust system 62 for exhausting combustion products from motor 60 includes manifold 64 connected to the motor 60 and tail pipe 66 supported by the main frame 12. The tail pipe 66 conventionally includes a muffler 68 and other exhaust-gas-treatment devices. A pivotal connection 70 is provided which connects exhaust manifold 64 and tail pipe 66 in a manner to permit the angular displacement of the steerable frame and the motor with respect to the main frame. The pivotal connection 70 is axially aligned with the turning axis A—A of pivot 30 connecting the main frame 12 to the steerable frame 20.

The steerable frame 20 consists essentially of a pivot support 72 which receives pivot pin 74 in bearings 76 and 78. The pivot pin 74 is further received in a journal 80 encompassed by pivot support 72, the journal 80 being fixed to an extension of main frame 12. Depending from pivot support 72 is a pair of braces 82 and 84. A motor support 86 is fixed to braces 82 and 84 and extends substantially horizontally forward from the braces 82 and 84. The motor 60 is fixed to the motor support 86 in transverse fashion such that power is available on either side of the engine from crankshaft 88. A rotatable drive shaft or jackshaft 90 is arranged in appropriate bearing supports 92 at a lower end of supports 82 and 84. The distance between the crankshaft 88 and jackshaft 90 is adjustable to a small degree by means of fixed adjustment mechanism 94 which adjusts the angular position of motor support 86 with respect to supports 82 and 84.

The front wheels 22 and 24, fixed to each other by axle 28, are supported by appropriate bearings 96 which are fixed to front-wheel support 98. The front-wheel support 98 is pivotally connected to the jackshaft 90 so as to pivot horizontally in a manner described by arc B shown in FIG. 4. A biasing means, such as coil spring 100, biases the front wheels 22 and 24 in contact with the underlying road or other vehicle-supporting surface. A shock absorber 102 is provided immediately behind coil spring 100 to dampen the spring action of spring 100, the shock absorber 102 being fixed between front-wheel support 98 and pivot support 72. The rearward angle of inclination of axis A—A of pivot 30 with respect to the true vertical may vary somewhat but is believed to optimally be about 3.5 degrees. A disk-brake support 104 can be provided fixed to front-wheel support 98. A braking disk 106 can then be fixed to axle 28 joining front wheels 22 and 24 to be acted upon by a disk-braking system fixed to the brake support 104.

FIGS. 5A, 5B, and 5C illustrate the turning features of a motor vehicle constructed in accordance with FIGS. 1-4. FIG. 5A shows the vehicle with the wheels directed straight ahead of the motor vehicle in which case both tires 22 and 24 are in contact with the surface of the road or other vehicle-supporting surface. As the steering wheel 50 of the motor vehicle is turned in the clockwise direction, the tie rod 56 and bearing 58 are caused to move to the right side of the motor vehicle as viewed from the passenger compartment and to the left side of FIG. 5A. Because the axis A—A of pivot 30 is inclined, as this turning motion takes places, an increasing pressure is placed on tire 22 and decreasing pressure is placed on tire 24, such that there is a lateral displacement of the ground-engaging portion of the front wheels in the direction of the angular displacement of the steerable frame 20. As the steerable frame 20 continues to respond to the clockwise turning of steering wheel 50, the wheels 22 and 24 assume the position shown in FIG. 5B with merely wheel 22 still in contact with the vehicle-supporting surface. In a similar manner, when the steering wheel 50 is turned in the counterclockwise direction so as to cause the car to turn to the left as viewed from the passenger compartment of the vehicle or to the right as viewed in FIGS. 5A-C, the front wheels assume the position shown in FIG. 5C with wheel 24 in sole contact with the vehicle-supporting surface. This lateral displacement of the ground-engaging portion of the front wheels in the direction of the angular displacement of the steerable frame aids in the turning function of the car. It will be noted that the weight of engine 60 is automatically shifted to the inside of the corner which is observed to give the motor vehicle extraordinary cornering ability.

The crankshaft 88 of motor 60 is connected to rotatable jackshaft 90 by means of a torque converter 108 driving belts 110. The crankshaft 88 of motor 60 rotates in a clockwise fashion as viewed in FIGS. 6 and 7. This clockwise motion of crankshaft 88 is transmitted to jackshaft 90 which, under the power transmitted by belts 110, similarly rotates in a clockwise fashion. A high-torque, belt-driven unit 112 on axle 28 is connected to jackshaft 90 by a toothed belt 114. The rotation of jackshaft 90 is thus transmitted to axle 28. The clockwise rotation of jackshaft 90 will cause a similar clockwise rotation of front-wheel axle 28, thereby causing the motor vehicle to move in a forward direction.

A reversing mechanism is provided for causing the car to move rearwardly. The reversing mechanism includes a torque-transmitting element such as pulley 116 mounted on arm 118 which is, in turn, pivotally connected to support 82 and motor support 86. The pulley 116 receives a belt 120 which is loosely looped over a pulley 122 connected to crankshaft 88 of motor 60. Shield 124 receives belt 120 when in its loose position so as to retain it in operable position adjacent to pulley 122. Pulley 116 further includes teeth 126 which are engageable with a similarly toothed gear 128 fixed to jackshaft 90. Pulley 116 remains out of engaged relationship as shown in FIG. 6 when the motor vehicle is other than in its reverse mode.

To activate the rearward motion of the vehicle, a second arm 130 pivotally connected to motor support 86 pivots the second arm 130 and includes a cam or lobe 132 which contacts arm 118, thereby causing a downward motion of that arm which in turn causes the teeth 126 to engage with toothed gear 128. A pulley 134 mounted on the opposite end of arm 130 from lobe 132 contacts the outside surface of belt 120 causing the belt 120 to tighten on the outer periphery of pulleys 116 and 122. The clockwise rotation of crankshaft 88 is thus transmitted to pulley 116 which similarly rotates in clockwise fashion. The clockwise rotation of pulley 116 when engaged with toothed gear 128 causes jackshaft 90 to rotate in a counterclockwise direction. The counterclockwise rotation of jackshaft 90 thus causes a similar counterclockwise rotation of axle 28 and front wheels 22 and 24 whereby the motor vehicle moves in a rearward direction. It is to be noted that when the reverse motion of the motor vehicle is activated, as shown in FIG. 7, the torque converter 108 is not disconnected from jackshaft 90. Rather, torque from motor 60 is supplied to the wheels 28 by means of the torque-transmitting pulley 116 in excess of that supplied by the torque converter 108; and hence, the motor vehicle moves in a rearward direction.

Although the invention has been described in detail with reference to certain figures illustrating the preferred embodiment, variations and modifications exist within the scope and spirit of the invention as described and defined in the following claims.

What is claimed is:

1. A motor vehicle comprising
   a main frame,
   rear-wheel means connected to the main frame in substantially fixed alignment therewith for supporting the main frame,
   a steerable frame at the forward end of the main frame, including a motor support, and a front-wheel support extending rearwardly from the motor support, the front-wheel support being pivotally supported with respect to the motor support about a horizontal axis,
   front-wheel means connected to the front-wheel support rearward of and remote from the horizontal axis in fixed alignment with the steerable frame, the front-wheel means having a laterally extending ground-engaging portion, and
   a pivot connecting the steerable frame to the main frame behind the front-wheel means, the lower end of the axis of the pivot being in front of the upper end of the axis, whereby anular displacement of the steerable frame with respect to the main frame causes a lateral displacement of the ground-engaging portion of the front-wheel means in the direction of the anular displacement.

2. The motor vehicle of claim 1 wherein the front-wheel means comprises a pair of laterally separated wheels, and an axle joining the pair of wheels, the axle being connected to the steerable frame normal to and in substantial alignment with the axis of said pivot.

3. The motor vehicle of claim 2 wherein the rear-wheel means comprises a pair of wheels connected to the main frame at a fixed distance from each other and wherein the pair of wheels comprising the front-wheel means are separated from each other by only a minor portion of the distance separating the rear wheels.

4. The motor vehicle of claim 1 wherein the front-wheel means comprises a pair of laterally separated wheels, a front axle joining the pair of wheels, and biasing means between the steerable frame and the axle for biasing the front wheels in contact with any vehicle-supporting surface.

5. The motor vehicle of claim 4 wherein said biasing means is a coil spring aligned with said pivot connecting the main frame and the steerable frame.

6. The motor vehicle of claim 1 further comprising a passenger compartment situated on the main frame, a substantially closed body surrounding the passenger compartment, a windshield in the body for permitting an occupant of the passenger compartment to view the forward direction of the motor vehicle, and a door permitting ingress and egress of passengers, the door being hinged to the body adjacent the top of the windshield, the door extending rearwardly therefrom over substantially the full extent of the main frame.

7. The motor vehicle of claim 1 further comprising a motor mounted on the steerable frame and movable therewith, an exhaust manifold connected to the motor, a tail pipe supported by the main frame, and a pivotal connection between the manifold and the tail pipe in axial alignment with the turning axis pivot connecting the steerable frame to the main frame.

8. The motor vehicle of claim 1 further comprising a motor mounted on the motor support, a rotatable shaft supported on the motor support substantially colinear to said horizontal axis and powered by the motor, and means for transmitting power from the rotatable shaft to the front-wheel means whereby the motor vehicle is caused to move.

9. The motor vehicle of claim 8 further comprising a torque converter coupled to the motor and to the rotatable shaft for moving the motor vehicle in a forward direction, and an arm movably connected to the motor support, a torque-transmitting element supported on the arm, means for engaging the torque-transmitting element with the rotatable shaft, and means for supplying torque from the motor to the torque-transmitting element in excess of that supplied by said torque converter, whereby the motor vehicle moves in a rearward direction.

10. A motor vehicle comprising a motor support, a motor supported on the motor support, wheel means supporting the motor support with respect to any vehicle-supporting surface, a rotatable shaft supported on the motor support, means for transmitting motion of the rotatable shaft to the wheel means, a torque converter coupled to the motor and to the rotatable shaft for moving the motor vehicle in a first direction, a torque-transmitting element movably connected to the motor support including a first pulley mounted on a first arm pivotally connected to the motor support for selective engagement with the rotatable shaft, means supplying torque from the motor to the torque-transmitting element in excess of that supplied by the torque converter for moving the motor vehicle in a second direction opposite the first direction including a belt frictionally engageable with the first pulley and the motor, and means for engaging the torque-transmitting element with the rotatable shaft including a second arm rotatably connected to the motor support having a cam surface fixed thereto in contact with the first arm, whereby rotation of the second arm causes the first arm to move relative to the rotatable shaft.

11. The motor vehicle of claim 10 wherein the second arm further comprises a second pulley adapted for engagement with said belt for tightening the belt and thereby increasing its frictional contact with the motor and first pulley, and wherein the first pulley is connected to a toothed gear engageable with a similarly toothed gear fixed to said rotating shaft.

* * * * *